March 27, 1928.
G. W. RAY
VEHICLE CHASSIS
Filed March 3, 1927
1,664,131
Fig. 1.
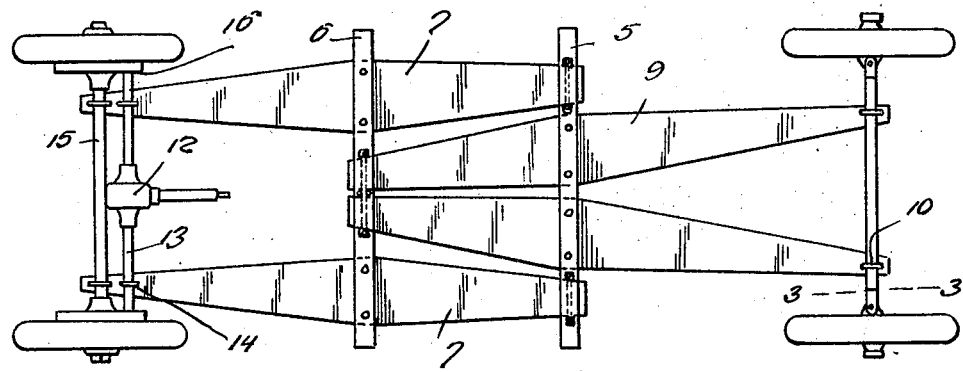
Fig. 2.
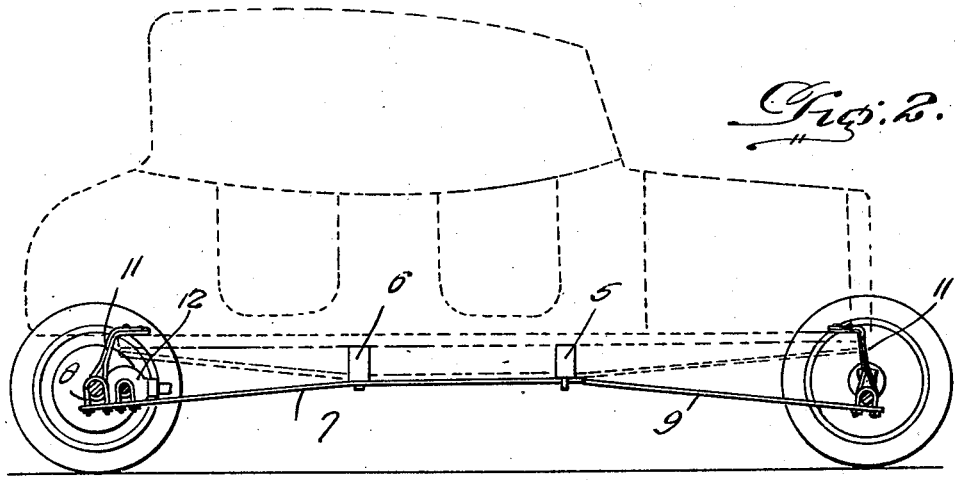
Fig. 3.
Inventor
George W. Ray,
By Clarence A. O'Brien
Attorney Patented Mar. 27, 1928.

1,664,131

UNITED STATES PATENT OFFICE.

GEORGE W. RAY, OF FORTY FORT, PENNSYLVANIA.

VEHICLE CHASSIS.

Application filed March 3, 1927. Serial No. 172,411.

The present invention relates to a vehicle chassis and aims to provide a device of this nature built on the cantilever spring principle in order to afford easy and comfortable riding.

Another important object of the invention resides in the provision of a spring chassis of this nature including cross members to be attached to the body of the vehicle intermediate its ends and between the wheels thereof and having springs projecting forwardly and rearwardly therefrom and engaged with the axles thereof and means for limiting the movement of the body in respect to the axles.

With the above and numerous other objects in view as will appear as the description appears, the invention resides in certain novel features of construction, and in the combination and arrangement of parts as will be hereinafter more fully described and claimed.

In the drawing:—

Figure 1 is a bottom plan view of the vehicle spring chassis embodying the features of my invention, Figure 2 is a vertical longitudinal section therethrough, showing the spring structure in side elevation, Figure 3 is an enlarged detail section taken substantially on the line 3—3 of Figure 1.

Referring to the drawing in detail, it will be seen that 5 and 6 denote cross bars which are adapted to be fixed to the body of a vehicle intermediate its ends adjacent the center in any suitable manner. A pair of flat spring members 7 are fixed to the ends of the bar 5 and extend rearwardly therefrom having their intermediate portions fixed to the bar 6 and extend rearwardly therefrom and are attached to the rear axle by U-bolts 8 or in any other suitable manner to be disposed so that their ends terminate below the rear axle. A pair of slat-like spring members 9 have their rear ends attached to the central portions of the bars 6 and their intermediate portions attached to the intermediate portions of the bars 5 and extend forwardly therefrom under the front axle being attached thereto by U-bolts 10 or in any other suitable manner. These slat-like spring members 7 and 9 taper from their intermediate portions towards their ends and the intermediate widened portions of the members 7 are attached to the bar 6 and the similar portions of the members 9 are attached to the bar 5. Straps 11 are attached to the body of the vehicle and extend downwardly and around the two axles as is clearly illustrated in Figure 3 to limit the upward movement of the body with respect to the axle. The numeral 12 denotes the differential drive the shaft housing 13 of which is attached as at 14 to the rear ends of the members 7 forwardly of the rear axle 15. The wheels will be driven by suitable mechanism or gearing housed as at 16.

From the above detailed description it will be seen that I have devised a very easy riding vehicle affording the maximum comfort. The device may be manufactured at a relatively low cost and will prove strong and durable in use.

It is thought that the construction, utility, and advantages of this invention will now be clearly understood by those skilled in this art without a more detailed description thereof. It is apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A device of the class described comprising a pair of cross bars disposed in spaced parallelism, a pair of flat-like spring members having their ends attached to one bar and their intermediate portion attached to the other bar adjacent the ends of the bars, a second pair of flat-like springs attached at their ends to the central portion of said other bar and having their intermediate portions attached to the intermediate portion of said one bar.

2. A device of the class described comprising a pair of cross bars disposed in spaced parallelism, a pair of flat-like spring members having their ends attached to one bar and their intermediate portion attached to the other bar adjacent the ends of the bars, a second pair of flat-like springs attached at their ends to the central portion of said other bar and having their intermediate portions attached to the intermediate portion of said one bar, a pair of axles one attached to the ends of each pair of flat-like springs.

3. A device of the class described comprising a pair of cross bars disposed in spaced parallelism, a pair of flat-like spring members having their ends attached to one bar and their intermediate portion attached to the other bar adjacent the ends of the bars, a second pair of flat-like springs attached at their ends to the central portion of said other bar and having their intermediate portions attached to the intermediate portion of said one bar, a pair of axles one attached to the ends of each pair of flat-like springs, straps engaged with the axle and adapted to be engaged with a body mounted on the bars.

In testimony whereof I affix my signature.

GEORGE W. RAY.